(12) United States Patent
Regunathan et al.

(10) Patent No.: US 10,194,408 B2
(45) Date of Patent: Jan. 29, 2019

(54) SYSTEM AND METHOD FOR ESTABLISHING VIRTUAL BEAMS FOR INITIAL TIMING SYNCHRONIZATION IN A SATELLITE COMMUNICATION NETWORK

(71) Applicant: Hughes Network Systems LLC, Germantown, MD (US)

(72) Inventors: Murali Regunathan, Germantown, MD (US); David Whitefield, Gaithersburg, MD (US)

(73) Assignee: HUGHES NETWORK SYSTEMS LLC, Germantown, MD (US)

( * ) Notice: Subject to any disclaimer, the term of this patent is extended or adjusted under 35 U.S.C. 154(b) by 0 days.

(21) Appl. No.: 15/666,939

(22) Filed: Aug. 2, 2017

(65) Prior Publication Data

US 2018/0279236 A1    Sep. 27, 2018

Related U.S. Application Data

(60) Provisional application No. 62/477,302, filed on Mar. 27, 2017.

(51) Int. Cl.
| | | |
|---|---|---|
| *H04W 56/00* | (2009.01) | |
| *H04W 84/06* | (2009.01) | |
| *H04B 7/185* | (2006.01) | |
| *G01S 19/07* | (2010.01) | |
| *G01S 19/02* | (2010.01) | |
| *H04W 88/16* | (2009.01) | |

(52) U.S. Cl.
CPC .......... *H04W 56/001* (2013.01); *G01S 19/02* (2013.01); *G01S 19/07* (2013.01); *H04B 7/185* (2013.01); *H04W 84/06* (2013.01); *H04W 88/16* (2013.01)

(58) Field of Classification Search
CPC .... H04B 7/0617; H04B 7/2041; H04B 7/185; H04W 4/023; H04W 16/28; H04W 16/14; H04W 56/001; H04W 84/06; H04W 88/16; G06F 17/3087; H01Q 1/288; B64G 1/1007; B64G 1/242; G01S 19/07; G01S 19/02

See application file for complete search history.

(56) References Cited

U.S. PATENT DOCUMENTS

| | | | |
|---|---|---|---|
| 4,686,673 A * | 8/1987 | Hotta ................... | H04B 7/2048 370/324 |
| 2014/0113546 A1* | 4/2014 | Picard ................ | H04B 7/18517 455/12.1 |
| 2015/0236779 A1* | 8/2015 | Jalali .................. | H04B 7/18508 342/367 |

(Continued)

*Primary Examiner* — Nizar N Sivji

(74) *Attorney, Agent, or Firm* — Global IP Counselors, LLP

(57) ABSTRACT

A system and method for establishing virtual beams for initial timing synchronization in a satellite communication network. The system and method perform operations of estimating, by a controller, a maximum satellite position error associated with an estimated position of a satellite of the satellite communication network within a satellite location space, and estimating, by a controller, a maximum remote unit position error associated with estimated position of a remote unit that is configured to communicate with the satellite of the satellite communication network. The system and method thus establish, by a controller, a size of the virtual beam based on the maximum satellite position error and the maximum remote unit position error.

18 Claims, 16 Drawing Sheets

(56) References Cited

U.S. PATENT DOCUMENTS

| | | | |
|---|---|---|---|
| 2015/0372737 A1* | 12/2015 | Park | H04W 16/28 |
| | | | 370/329 |
| 2016/0087713 A1* | 3/2016 | Oderman | H04B 7/18591 |
| | | | 370/319 |
| 2016/0105233 A1* | 4/2016 | Jalali | H04B 7/18504 |
| | | | 342/359 |

* cited by examiner

SYSTEM AND METHOD FOR ESTABLISHING VIRTUAL BEAMS FOR INITIAL TIMING SYNCHRONIZATION IN A SATELLITE COMMUNICATION NETWORK

CROSS-REFERENCE TO PROVISIONAL APPLICATION

This application claims priority under 35 U.S.C. § 119(e) to U.S. Provisional Patent Application No. 62/477,302, filed on Mar. 27, 2017. The entire contents of U.S. Provisional Patent Application No. 62/477,302 is incorporated herein by reference.

CROSS-REFERENCE TO RELATED APPLICATION

Related subject matter is disclosed in U.S. patent application Ser. No. 15/281,845, filed on Sep. 30, 2016. The entire contents of U.S. patent application Ser. No. 15/281,845 is incorporated herein by reference.

BACKGROUND

Field of the Invention

The present invention generally relates to a system and method for establishing virtual beams for initial timing synchronization in a satellite communication network. More particularly, the present invention relates to a system and method which establishes virtual beams for initial timing synchronization of remote user terminals in a geostationary satellite based communication network.

Background Information

Communication networks, such as satellite communication networks, employ satellite communication terminals at end-user sites which communicate with one or more satellites in the satellite communication network. As understood in the art, each satellite in the satellite communication network propagates at least one user beam onto a specific region of the earth. For a terminal in the user beam to be able to close the link with the gateway, it's location (latitude, longitude) should be known with precision.

When ordering an installation, a customer provides the installation location which can be as specific as the street address or even the GPS location information, or can be as general as simply the city or town name, or the postal code. Thus, in a typical installation process, the installer at the end-user site can use a location determining device, such as a global positioning system (GPS) device, Google Maps and so on, to determine the location of the satellite terminal if the customer only provided a street address or general information such as city and/or postal code. However, this process of obtaining location information complicates the overall installation process, and thus makes the installation process more time consuming. Furthermore, it is possible that in certain remote locations, such location information is difficult to obtain or unobtainable, which further complicates the process.

To ease this process, a system is proposed where a user beam is subdivided into multiple virtual beams. The center of a virtual beam within the user beam can be used as the terminal location information which is accurate enough for the satellite terminal to close a link with the satellite as long as the satellite terminal is within the virtual beam coverage area as understood in the art. As also understood in the art, the size and locations of the virtual beam (e.g., the number of the virtual beams in a user beam) will be determined by the timing error that is permissible in the system, which can be driven by, for example, customers' requirements, hardware constraints as well as the link budget calculation.

SUMMARY

In order to address these issues, the disclosed embodiments provide a method and system for establishing virtual beams for initial timing synchronization in a satellite communication network. The system and method perform operations of estimating, by a controller, a maximum satellite position error associated with an estimated position of a satellite of the satellite communication network within a satellite location space, and estimating, by a controller, a maximum remote unit position error associated with estimated position of a remote unit that is configured to communicate with the satellite of the satellite communication network. The system and method thus establish, by a system engineering controller, a size and location of each virtual beam based on the maximum satellite position error and the maximum remote unit position error.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
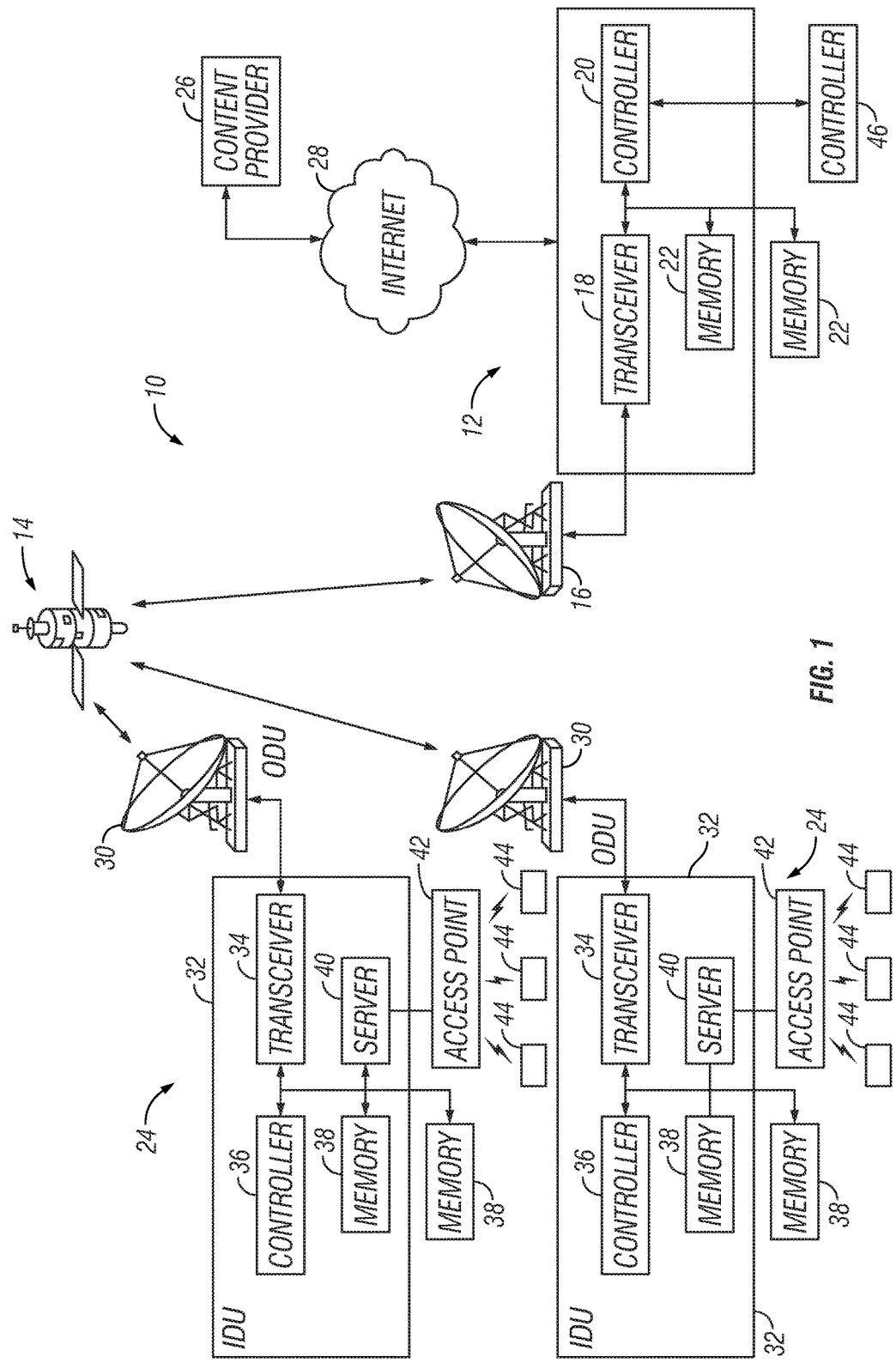
FIG. 1 illustrates an example of a satellite communication network according to a disclosed embodiment.

FIG. 1 illustrates an example of a satellite communication network 10 according to an exemplary embodiment. A satellite communication network 10 typically includes a plurality of terrestrially mounted gateways 12 that communicate with one or more orbiting satellites 14. Each satellite gateway includes an antenna dish 16, a transceiver 18, a controller 20, a memory 22 and other types of equipment (not shown) such as amplifiers, waveguides and so on as understood in the art on which enable communication between the gateway 12 and a plurality of satellite user terminals 24 via one or more of the orbiting satellites 14. The memory 22 can be, for example, an internal memory in the gateway 12, or other type of memory devices such as flash memory or hard drives with external high speed interface such as a USB bus or an SATA bus, or remote memories such as cloud storage and so on. These other types of memory can be present at the gateway 12 or accessible at a location apart from the gateway 12 via a network connection such as an Ethernet connection, a WiFi connection or any other suitable type of connection as understood in the art.

As understood in the art, the controller 20 preferably includes a microcomputer with a control program that controls the gateway 12 as discussed herein. The controller 20 can also include other conventional components such as an input interface circuit, an output interface circuit, and storage devices such as a ROM (Read Only Memory) device and a RAM (Random Access Memory) device. The RAM and ROM store processing results and control programs that are run by the controller 20. The controller 20 is operatively coupled to the components of the gateway 12 as appropriate, in a conventional manner. It will be apparent to those skilled in the art from this disclosure that the precise structure and algorithms for the controller 20 can be any combination of hardware and software that will carry out the functions of the present invention.

The gateway 12, satellites 14 and satellite user terminals 24 typically communicate with each other over a radio frequency link, such as a Ku-band link, a Ka-band link or any other suitable type of link as understood in the art. Also, one or more of the gateways 12 can be configured as a network management center or network operating center which, among other things, operate to communicate with remote sites, such as web content providers 26, via the Internet 28, cloud storage, or other communication networks as understood in the art. In addition, the gateways 12 can communicate with each other via, for example, the Internet 28 or other communication networks.

As further shown in FIG. 1, a satellite user terminal 24 typically includes an antenna dish 30 that is commonly referred to as an outdoor unit (ODU), and a device such as a set-top box or other type of equipment that is commonly referred to as an indoor unit (IDU) 32. The IDU 32 typically includes a transceiver 34, a controller 36, a memory 38, a local server 40 and other types of equipment (not shown) such as amplifiers, waveguides and so on as understood in the art on which enable communication between the satellite user terminal 24 and one or more gateways 12 via one or more of the orbiting satellites 14. A transceiver 34 can include, for example, an integrated satellite modem and any other suitable equipment which enables the transceiver 34 to communicate with one or more of the orbiting satellites 14 as understood in the art. The memory 38 can be, for example, an internal memory in the satellite user terminal 24, or other type of memory devices such as a flash memory or hard drives with external high speed interface such as a USB bus or an SATA bus, or remote memories such as cloud storage and so on. These other types of memory can be present at the satellite user terminal 24 or accessible at a location apart from the satellite user terminal 24 via a network connection such as an Ethernet connection, a WiFi connection or any other suitable type of connection as understood in the art.

As with the controller 20 for a gateway 12, the controller 36 preferably includes a microcomputer with a control program that controls the satellite user terminal 24 as discussed herein. The controller 36 can also include other conventional components such as an input interface circuit, an output interface circuit, and storage devices such as a ROM (Read Only Memory) device and a RAM (Random Access Memory) device. The RAM and ROM store processing results and control programs that are run by the controller 36. The controller 36 is operatively coupled to the components of the satellite user terminal 24 as appropriate, in a conventional manner. It will be apparent to those skilled in the art from this disclosure that the precise structure and algorithms for the controller 36 can be any combination of hardware and software that will carry out the functions of the present invention.

The memory 38 can be, for example, an internal memory in the terminal 24, or other type of memory devices such as a flash memory or hard drives with external high speed interface such as a USB bus or an SATA bus, or remote memories such as cloud storage and so on. These other types of memory can be present at the terminal 24 or accessible at a location apart from the terminal 24 via a network connection such as an Ethernet connection, a WiFi connection or any other suitable type of connection as understood in the art. Also, the local server 40 can communicate with an access point 42, such as a WAP or any other suitable device, which enables the local server 40 to provide packets to end user devices 44 as discussed herein. Such end user devices 44 include, for example, desktop computers, laptop or notebook computers, tablets (e.g., iPads), smart phones, Smart TVs and any other suitable devices as understood in the art. Naturally, the communications between the local server 38, the access point 42 and the end user devices 44 can occur over wireless connections, such as WiFi connections, as well as wired connections as understood in the art.

As further shown in FIG. 1, a controller 46, such as a system engineering controller as understood in the art, can be provided which performs the operations of a virtual beam determination process as discussed below. The controller 46 preferably includes a microcomputer with a control program that performs operations of the virtual beam determination process as discussed herein. The controller 46 can also include other conventional components such as an input interface circuit, an output interface circuit, and storage devices such as a ROM (Read Only Memory) device and a RAM (Random Access Memory) device. The RAM and ROM store processing results and control programs that are run by the controller 46. The controller 46 is operatively coupled to, for example, the controller 20 of the gateway 12 to communicate with the controller 20 as discussed herein in a conventional manner. It will be apparent to those skilled in the art from this disclosure that the precise structure and algorithms for the controller 46 can be any combination of hardware and software that will carry out the functions of the present invention.

FIGS. 2-16 illustrate examples of operations and features associated with a user terminal installation process according to disclosed embodiments. In a typical installation process, the installer at the end-user site uses a location determining device, such as a GPS device, to determine the location of the satellite terminal. However, the installation process according to the disclosed embodiments provides an IDU 32 having a memory 38 into which has been stored satellite terminal installation data that is accessible by a code. As discussed in more detail below, the stored satellite terminal installation data includes, among other things, a database of "spreadsheets" for all of the user beams (UBs) and their respective virtual beams (VBs) generated by the satellite communication network 10 in relation to corresponding locations, such as latitude and longitude, on the surface of the earth. Thus, the database matches virtual beams VBs to location data. That is, database matches each of the virtual beams VBs to the respective latitudes and longitudes of coverage areas on the surface of the earth that are provided by the respective virtual beams VBs.

Figure 2:
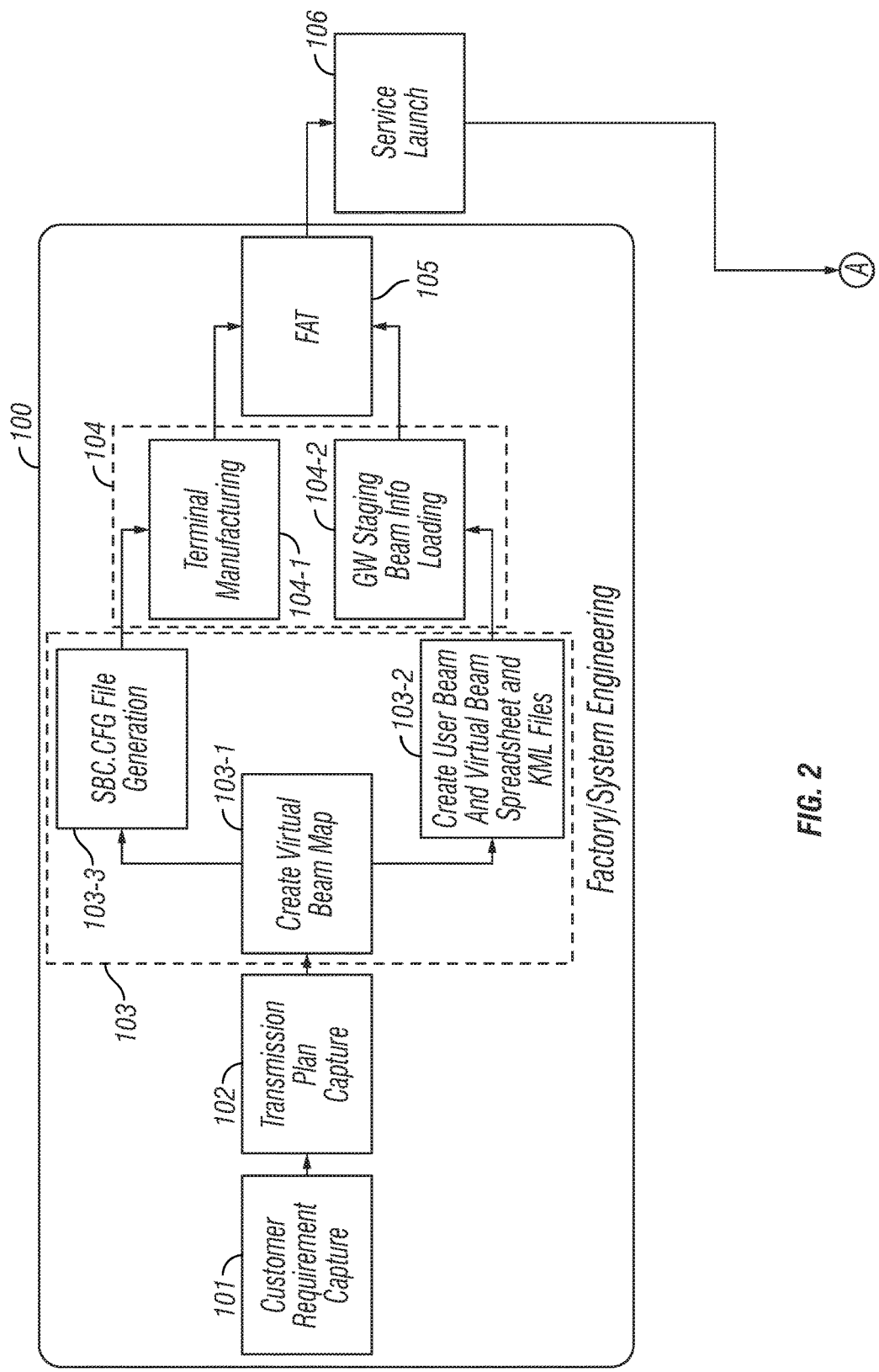
FIG. 2 is a conceptual flow diagram illustrating an example of operations associated with a terminal installation process according to a disclosed embodiment.
Figure 2:
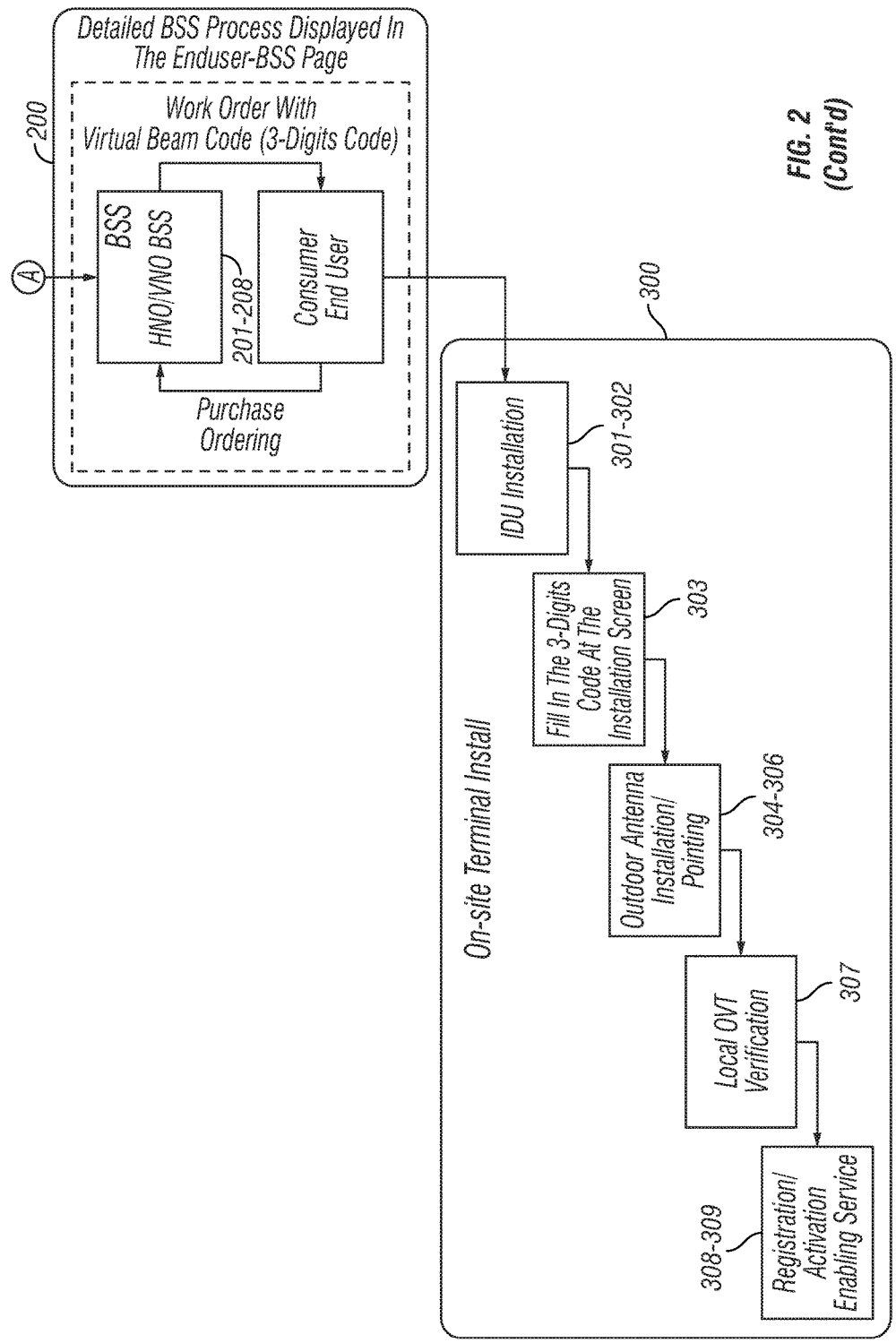
Figure 3:
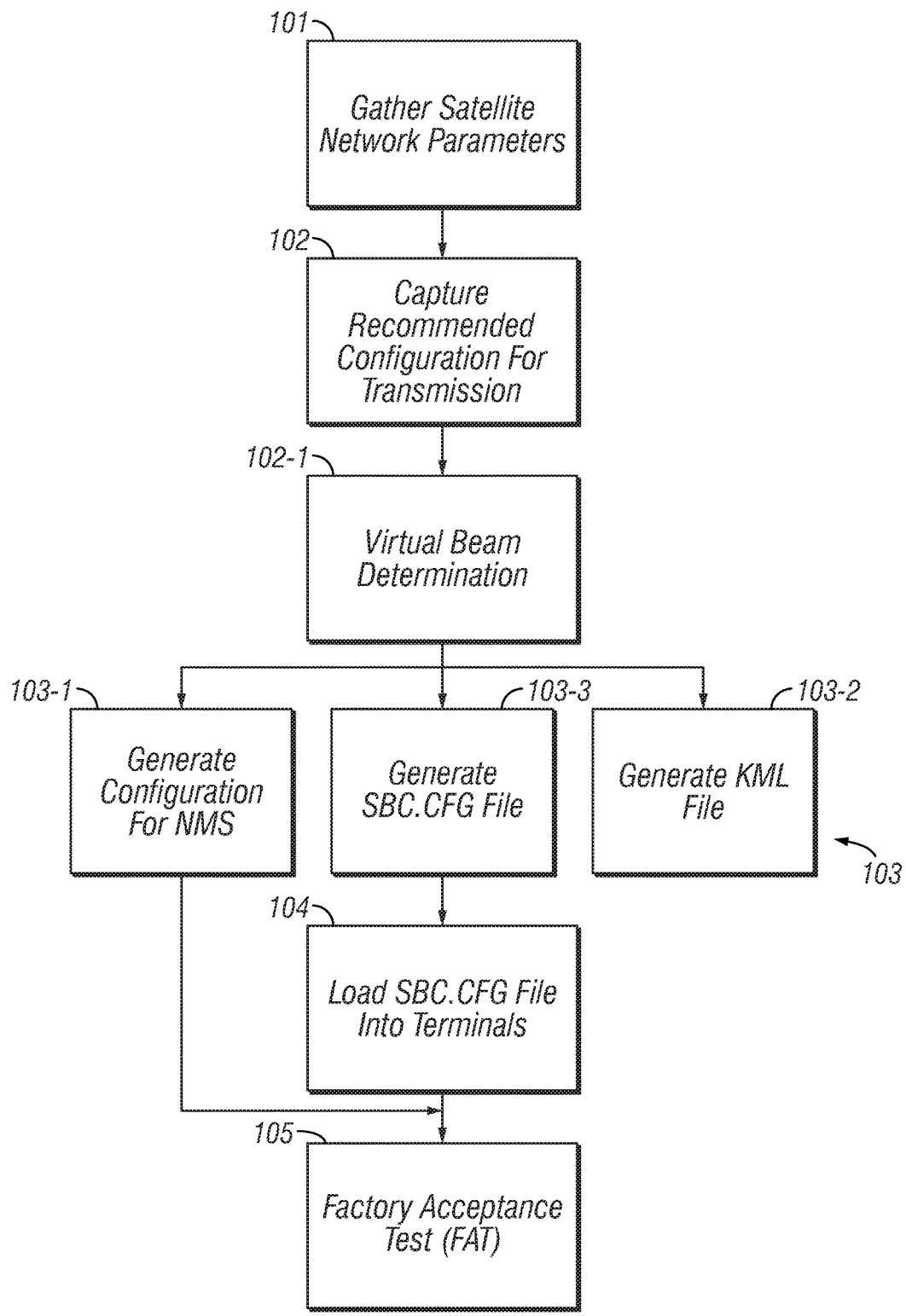
FIG. 3 is a flow chart illustrating an example of operations performed during the equipment manufacturing phase shown in FIG. 2.

As can be appreciated from the exemplary flow diagram shown in FIG. 2 and the flowchart of FIG. 3, the process according to a disclosed embodiment includes three phases, namely, the equipment manufacturing phase 100, the business support system phase 200 and the on-site terminal installation phase 300. Each of these phases will now be described. According to this example, operations 101, 102 and 103 discussed herein can be associated with or performed by the systems engineering controller 46 shown in FIG. 1.

During operation 101, information based on the network service provider (NSP) and the world wide (WW) virtual network operator (VNO) is captured for the satellite communication network 10 in any suitable manner as understood in the art. The information includes, for example, coordinates of the respective beam center and respective beam radii for each user beam UB, along with the respective coverage areas for each NSP and WW VNO that are mapped to the user beams UBs. The information further includes information pertaining to a minimum number of virtual beams VBs for each user beam radii to provide precise enough location info in order for a terminal 24 to acquire access to the satellite communication network 10 via, for example, large aperture bootstrap aloha for ranging which can be based upon TDMA closed-loop timing analysis, or any other suitable type of ranging, as understood in the art.

Figure 4:
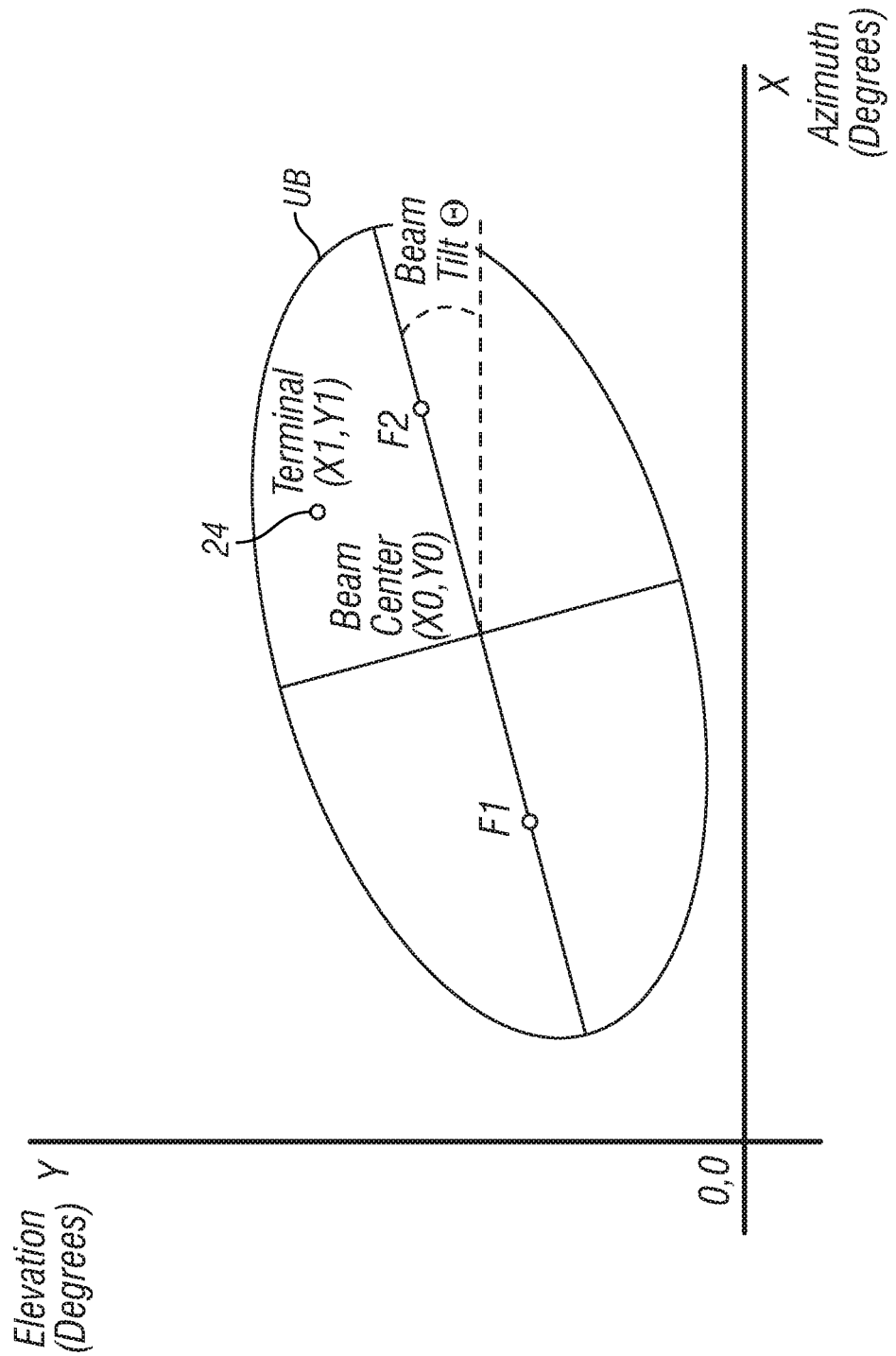
FIG. 4 illustrates an example of a user beam generated by a satellite in the satellite communication network shown in FIG. 1.

For example, as shown in FIG. 4, each user beam UB is typically shaped as an ellipse with a major axis and a minor axis of different lengths. The ellipses can also be rotated with respect to an X-Y coordinate system as understood in the art. Each user beam UB includes a set of virtual beams VBs as shown, for example, in FIG. 5. A virtual beam VB can have, for example, a radius that is small enough to acquire an ALOHA TDMA timeslot of 1 msec size, or any other suitable size as understood in the art. A union of the virtual beams VB of a user beam UB define the coverage area for a single user beam UB. The user beams UBs and their respective virtual beams VBs can be arranged in a best fit manner to provide a coverage area for the terminals 34 as understood in the art.

During operation 102, information pertaining to the configuration for transmission for each IDU 32 in the satellite communication network 10 is captured in any suitable manner as understood in the art. In addition, operation 102-1 for beam determination can be performed as discussed below with regard to FIGS. 11-14.

During operation 103, the database including the spreadsheets for each of the virtual beams VBs captured during operations 101 and 102 as discussed above is created. In this example, operation 103 includes three sub-operations 103-1, 103-2 and 103-3. During operation 103-1 a virtual beam map is created for all of the virtual beams VBs. As part of that virtual beam map, during operation 103-2, a respective unique install code for each virtual beam VB is entered in the respective spreadsheet for each virtual beam VB. The spreadsheets can include or be associated with keyhole markup language (KML) files as understood in the art.

In the examples discussed herein, an install code is a three-character code. However, the install code can be of any suitable length or configuration in order to enable an installer to access the installation information as discussed herein. In the examples discussed herein, each install code is a three-digit alpha numeric value. In order to avoid confusion at the installation site by the installer, each install code should avoid the number 0, upper case letter O, and lower case letter o since they can be easily confused on a printed label. For similar reasons, each install code should also should avoid number 1, upper case letter I, and lower case letter l since they can be easily confused on a printed label. Likewise, each install code should avoid upper case Q and upper case O if upper case is used since they can be easily confused on a printed label. Furthermore, each install code should avoid special characters (non-alpha, non-numeric) for ease of entry by the installer, and should avoid lower case characters and only use upper case characters to avoid incorrect data entry by the installer.

Figure 5:
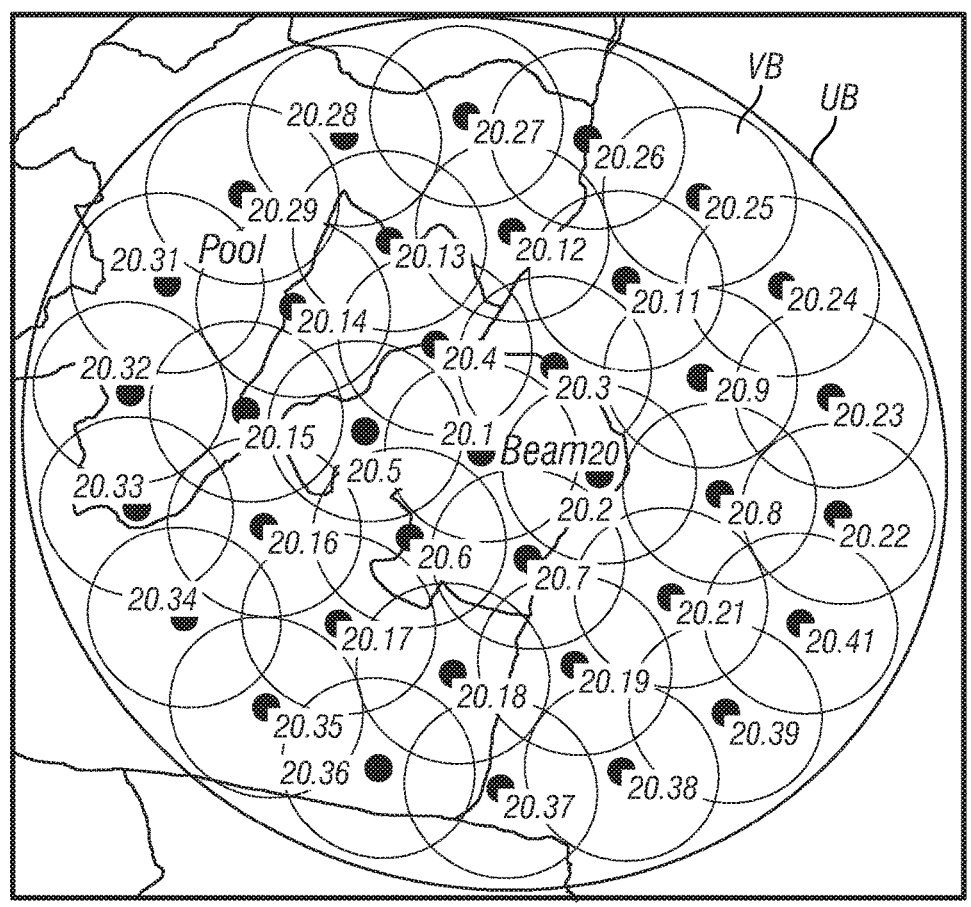
FIG. 5 illustrates an example of virtual beams included in a user beam such as that shown in FIG. 4.

Table 1 below is an example of three-character install codes associated with the virtual beams VBs shown in FIG. 5.

TABLE 1

| Virtual_Beam_ID | Install_Code |
| --- | --- |
| 20.1 | A55 |
| 20.2 | KFS |
| 20.3 | 5CT |
| 20.4 | 739 |
| 20.5 | MK6 |
| 20.6 | 3FR |
| 20.7 | YCR |
| 20.8 | FL5 |
| 20.9 | WBZ |
| 20.11 | VZA |
| 20.12 | U79 |
| 20.13 | 4ML |
| 20.14 | JWR |
| 20.15 | F45 |
| 20.16 | 2R4 |
| 20.17 | BPH |
| 20.18 | DJX |
| 20.19 | TJP |

The respective virtual beam spreadsheet for each respective virtual beam can include other information such as the virtual beam id, parent beam id, virtual beam center azimuth, virtual beam center elevation, beam radius, beam owner, parent beam state, virtual beam state, parent beam location, beam type and so on. This information matches the sbc.cfg file (satellite broadcast communication configuration file) that is created during operation 103-1.

Figure 6:
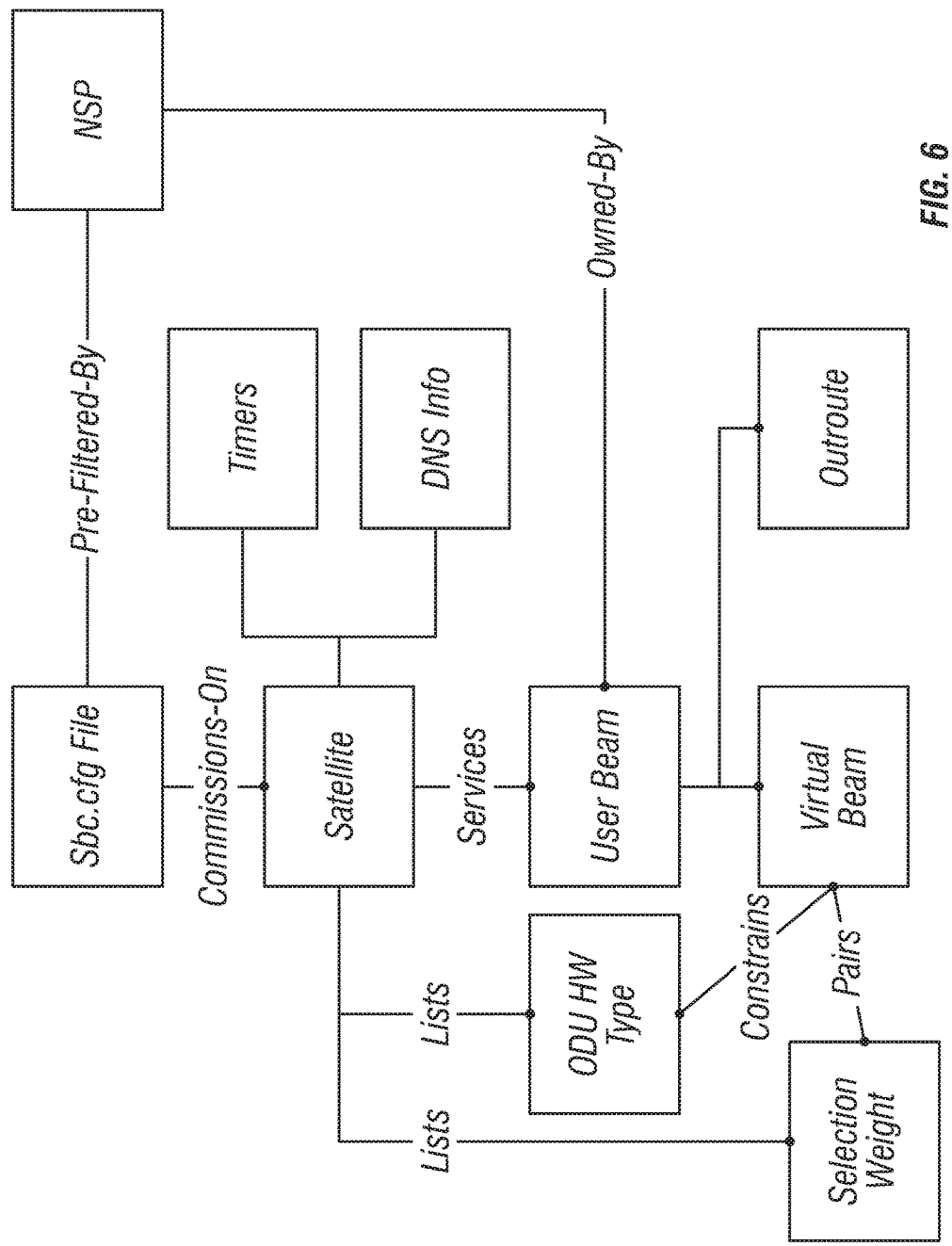
FIG. 6 is a conceptual block diagram illustrating an example of a satellite broadcast communication configuration file created during the equipment manufacturing phase shown in FIG. 2.

As shown in FIG. 6, the sbc.cfg files include information pertaining to the network service provider, the satellites 14 in the satellite communication network 10, the domain name system (DNS) and timers, the outdoor units (ODU) and their types of hardware such as antenna size (e.g., a 74 cm antenna, a 98 cm antenna or a 120 cm antenna), RF power (e.g., 1 Watt RF or 2 Watt RF) and so on. The sbc.cfg can further include information pertaining to the user beams UBs, the virtual beams VBs and their outroutes, and the selection weights associated with the virtual beams VBs as understood in the art.

During operation 104, the information created and generated during operation 103, including the information for the spreadsheets for each of the virtual beams VBs captured during operations 101 and 102, is stored in the memory 38 of each of the IDUs 32. Operation 104 can include operation 104-1 during which the IDU 32 is manufactured, and operation 104-2 in which the sbc.cfg files and any of the other information created and generated during operation 103 are stored in the memory 38 of each of the IDUs 32. Thus, data pertaining to all of the virtual beams VB and all of the install codes are stored in the memory 38 of each of the IDUs 32. Each IDU 32 is assigned a different part number to create WW VNO custom branded IDUs 32. Optionally, factory acceptance testing can be performed on each of the IDUs 32 in operation 105. The IDUs 32 are then ready for deployment to end users during the service operation 106 on as as-needed basis.

Figure 7:
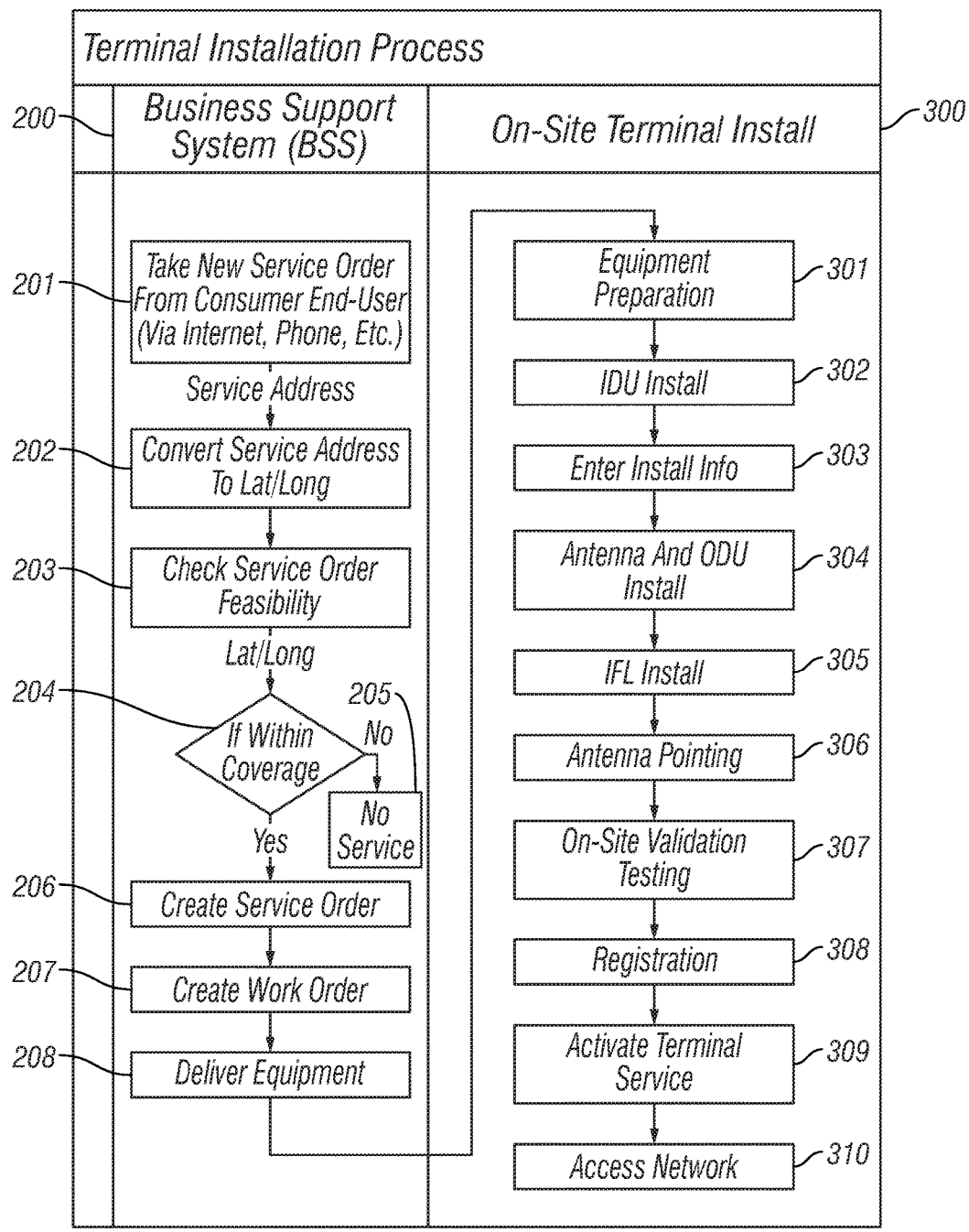
FIG. 7 is a flow chart illustrating an example of operations performed during the business support system phase and the on-site terminal installation phase shown in FIG. 2.
Figure 8:
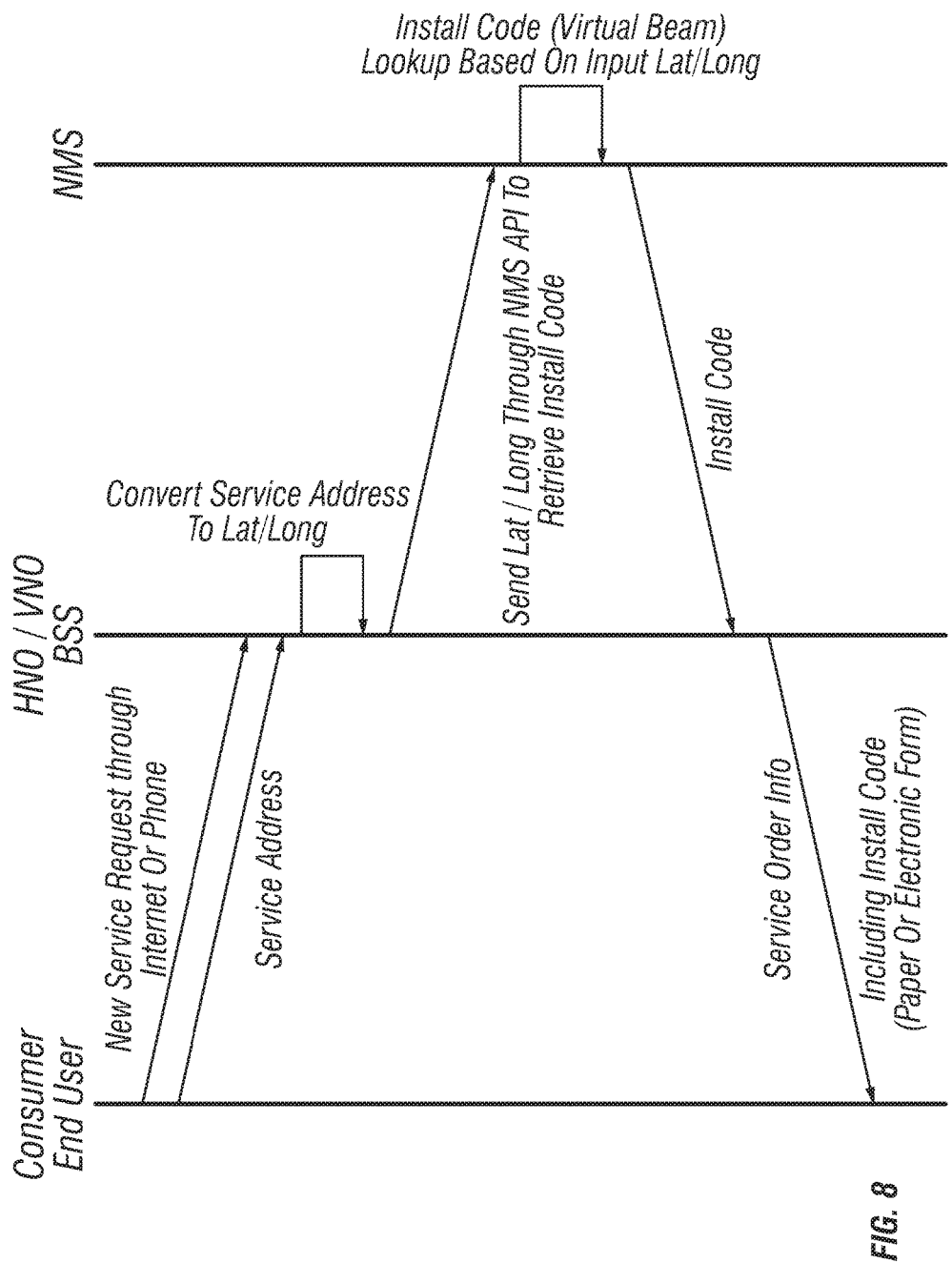
FIG. 8 is an exemplary flow diagram illustrating an example of operations performed during the business support system phase and the on-site terminal installation phase shown in FIGS. 2 and 7.

Exemplary operations of the business support system phase 200 are shown in FIGS. 2, 7 and 8, when an end-user wishes to obtain service from the satellite communication network 100, the end-user contacts the business support system in step 201 to request installation of a terminal 24. An operator (the BSS operator) at the business support system can take the end-user's information via telephone, on-line or in any suitable manner. The end-user's information includes the address at which the terminal 24 is to be installed (the installation address), which can correspond to the end-user's address.

During step 202, the BSS operator converts the installation address into longitude and latitude coordinates using, for example, Google Maps, Google Earth or any other suitable software or application. For example, the BSS operator can us the Google Map API to convert the street address of the installation address into latitude and longitude. The BSS operator can also use the Google Earth GUI to locate the street address to determine its latitude and longitude, or some similar map application that provides latitude and longitude as understood in the art. In addition, the BSS operator can update the information stored in the memory 38 of a terminal 24, such as information pertaining to additional user beams UBs and virtual beams VBs in additional service areas, and so on as understood in the art.

In step 203, the BSS operator determines whether a terminal 24 can be deployed and will operate at the installation address. For instance, the BSS Operator enters the selected NSP or WW VNO into a database of virtual beams VBs to filter the list of available virtual beams VBs at that installation address. If the BSS operator determines in step 204 that the installation address fails to lie within any of the user beams UBs, then service is unavailable at that installation address. In this case, the BSS operator informs the end-user that service is not available in step 205. However, if service is available at the installation address, the BSS operator will create a service order in step 206.

To create the service order, the BSS operator can use, for example, an NMS-provided web-based API to convert the latitude and longitude into a selected VB and its install code. The BSS operator includes the install code in the service order and provides this install code to the end-user and/or to the installer of the terminal 24 in any suitable manner. Naturally, the end-user can be the person who will install the terminal 24. For instance, the BSS operator can provide the install code as a printed code on the service order sent to the end-user or installer with the terminal 24. The BSS operator can send the install code to the end user and/or installer via email, via online access, via a text message or voice message, or in any other suitable manner.

In step 207, the BSS operator creates a work order. In step 208, the BSS operator has the terminal 24 delivered to the end-user, which could be the installer, or to the installer.

Figure 9:
FIG. 9 illustrates an example of a display screen for entering information during the on-site terminal installation phase as shown in FIGS. 2, 7 and 8.
Figure 10:
FIG. 10 illustrates an example of a display screen displaying testing information during testing operations performed in the on-site terminal installation phase as shown in FIGS. 2, 7 and 8.

Exemplary embodiments of the on-site terminal installation phase 300 are shown in FIGS. 2, 7 and 8. In step 301, the installer prepare the equipment of the terminal 24. In step 302, the installer installs the IDU 32 and powers up the IDU 32. The installer uses a user interface, such as any of the type of end user devices 44 discussed above, to access the installation information stored in the memory 38 of the terminal 24 as discussed above. In particular, in step 303, the user uses an end user device 44 to enter the install code. For example, as shown in FIG. 9, the end user device 44 can display a window W on its graphical user interface into which the installer can enter the install code (e.g., ZZZ). If the install code is invalid or incorrectly entered, the end user device 44 can display an error message in the window W, and the installer can try to reenter the code or contact the business support system (BSS) if failures continue.

In response to a properly entered access code, the controller 36 access the installation information from the memory 38, and that information is, for example, displayed on the end user device 44. Thus, the controller 36 of the terminal 24 converts the install code based upon, for example, its sbc.cfg into a selected virtual beam VB. The terminal 24 informs the installer via the end user device 44 of the installation information for the dish 30, including azimuth, elevation, tilt, polarization for the selected virtual beam center, which is converted by the terminal 24 into latitude and longitude used by the terminal as part of its terminal ranging, commissioning, registration, and swaps.

The installer uses this installation information to install the dish 30 and angle the dish appropriately in steps 304, 305 and 306. For example, the installer can mount the dish in step 304. In step 305, the installer can install the interfacility link (IFL), such as the cable between the ODU and the IDU. In step 306, the installer can point the dish 30 at the appropriate elevation and angle as understood in the art. The user can follow the instruction indicated in the window W displayed by the end user device 44 by clicking on the appropriate buttons (e.g., "next," etc.) and dropdown menus.

Examples of the type of information that can be displayed are shown in Tables 2 and 3 below. In Table 2, the Target and Estimated SQF values are displayed since the local on-site verification tool (OVT) is enabled. In Table 3, the Target and Estimated SQRF values are not displayed since the local OVT is disabled. Naturally, the amount of information and the manner in which the information is displayed can be programmed into the terminal 24 during the equipment manufacturing phase 100 as discussed above and/or during updating in the business support system phase 200.

TABLE 2

| | |
|---|---|
| Azimuth | 189.589° |
| Elevation | 46.598° |
| Antenna Tilt | 8.026° |
| Uplink Pol | Right-Hand (RH) |
| Beam Selected | 14 |
| Outroute Num | 16 |
| Target SQF (System) | 220 |
| Estimated Target SQF (Local) | 180 |

TABLE 3

| | |
|---|---|
| Azimuth | 189.589° |
| Elevation | 46.598° |
| Antenna Tilt | 8.026° |
| Uplink Pol | Right-Hand (RH) |
| Beam Selected | 14 |
| Outroute Num | 16 |

In step 307, which is optional, the installer can perform verification operations as understood in the art. For example, the terminal 24 can acquire a system information message containing the required minimum signal strength value for the given user beam's center. The terminal 24 extrapolates its required signal strength value based upon its virtual beam center's distance from the user beam's center. The installer can performs antenna pointing operations either using a DAPT connected inline of the IFL at the ODU which provides a good/bad indicator to the installer if the signal strength meets its required minimum, or using a WiFi enabled device with a web browser to connect via WiFi to reach the terminal IDU 32 which shows signal strength values on its Web UI with the WiFi being provided by either a separate installer-provided WiFi router with a wired connection to the terminal IDU 32 or an integrated WiFi router built into the terminal IDU 32. The installer performs antenna pointing to maximize the signal strength based upon this given feedback of signal strength values as they adjust the terminal antenna.

If the installation is unsuccessful, the installer can be instructed by the information displayed by the end user device 44 to perform any or all of the operations 304, 305 and 306 again, and repeat the validation testing in step 307. Once the testing is successful, the installer performs registration operations in step 308 to register the terminal 24. At the end of the terminal's registration, the terminal 24 provides its transmit and receive related EsNo readings, antenna size and radio wattage data to the test center, and based on the terminal's relative location to the center of the user beam UB, and the OVT test suite normalizes the thresholds and values in a manner consistent with the result of the calculation performed during the antenna pointing process.

The installer then activates the service in step 309. In addition, in step 310 which is optional, the installer may optionally perform, based upon the business processes defined by the NSP, a centralized OVT in order to get a signoff code for the installation. For instance, the installer can click on the URL link on the end user device 44 to navigate to the centralized OVT's web page. The centralized OVT collects actual install info from the terminal 24 to determine if the installation meets required value ranges for a successful install. The centralized OVT provides a sign off code to the installer for a successful install. While the testing is being performed, the GUI of the end user device 44 can display information pertaining to the testing as shown, for example, in FIG. 10. For instance, the installer can update the local OVT mandatory optional field by, for example, selecting a dropdown menu. The terminal 24 can acquire this message and normalize the downlink EsNo value to at least meet the minimum threshold to pass the antenna pointing process. Alternatively, the controller 36 in the terminal 24 can still calculate the normalized downlink EsNo value, whether the EsNo value meets the threshold value or not, the operator can always move to the next page of installation.

Once the installation and OVT operations are complete, the end-user can then begin accessing the satellite communication network 10 in step 311 to, for example, browse the Internet and so on.

As can be appreciated from the above, the method and system according to the disclosed embodiments requires no use of GPS or any other location determining services during the installation of the terminal 24. The embodiments also improve the usability of the software in the terminal 24 by reducing the number of parameters required during the installation, which in turn reduces the possibilities of satellite beam info selection error and terminal location errors caused by human error. Thus, the installation process is simplified since it is unnecessary for detailed messages displayed on the graphical user interface of the end user device 44 being used by the installer, and instead, more effective and detailed antenna pointing guidelines are displayed. Each terminal will be assigned with a 3-digit alphanumerical install code. Also introduced a new mechanism to provide better antenna pointing guide lines during installation.

In addition, as discussed above with regard to step 102-1 in the flowchart of FIG. 3, a virtual beam determination process can be performed during or after step 102, and during or before steps 103-1, 103-2 and 103-2 shown in FIGS. 2 and 3 as now will be described. This process generally can be described as a method for using virtual beams VBs for initial timing synchronization in a geostationary satellite based communication system. In this example, the virtual beam determination process is performed by the controller 46 as shown in FIG. 1, and the information obtained by the controller 46 is communicated to the controller 20 of the gateway in, for example, step 104-2 as shown in FIG. 2 and described above. Again, although for illustrative purposes the flowchart of FIG. 3 shows step 102-1 as being after step 102 and before steps 103-1, 103-2 and 103-3, the operations of the virtual beam determination process can be performed as, for example, part of step 103-1

Initial timing synchronization between the remote and the hub in a satellite based communication system, such as satellite communication network 10, requires the precise knowledge of the location of the remote (i.e., the user terminal 24), the hub (i.e., the gateway 12), and the satellite (i.e., a satellite 14). The delay between the satellite 14 to the user terminal 24 and the gateway 12 to satellite 14 can be calculated accurately if the location of all three are known. In most systems, the location of the gateway 12 is known accurately. The location of the geostationary satellite 14 is bounded by the station keeping parameters. The location of the user terminal 24 can be known precisely if a GPS receiver is used at installation time. The unavailability of a GPS receiver at the terminal site, especially in developing remote areas, creates an issue with initial synchronization. In certain situations, the center of the terminal zip code can be used as a replacement but in others, the best alternative can be the nearest city.

If the error in location accuracy of the user terminal 24 is large, the timing error in the initial burst will be large and might prevent the burst from being received by the gateway 12. To alleviate this problem, a certain sized circular area can be used to specify the location of any user terminal 24 in and around that area. Each user beam coverage area will be divided into many such circles, which will each have a particular code number that can be entered by the installer. The center of the circle will be used to define the location of any terminal in the circle. These areas will be defined as virtual beams VBs for beam selection as discussed above with regard to, for example, FIG. 5. The terminology "virtual beam" is for referring to these areas within a user beam UB.

This design affects the initial Inroute burst timing synchronization from the user terminal perspective. The user terminal transmissions will each have a different arrival time depending on their actual location inside the virtual beam VB. To be able to successfully receive all the initial bursts, the gateway receive window (aperture size) is set to accommodate the difference in timing arrival between bursts from terminals on opposite ends of the virtual beam VB. To ease the installation process, the process could have one virtual beam VB covering the whole user beam UB, but this will make the gateway demodulator receive aperture extremely large. Instead, the process can use the maximum available receive aperture window supported by the gateway 12 to calculate the size of the virtual beam VB. For each user beam UB, the process finds the maximum virtual beam size that will also satisfy the gateway aperture requirement. The analysis in this document describes the method used to calculate the size of these virtual beams VBs for a user beam UB.

Analysis of Timing Errors in Initial Synchronization

Figure 11:
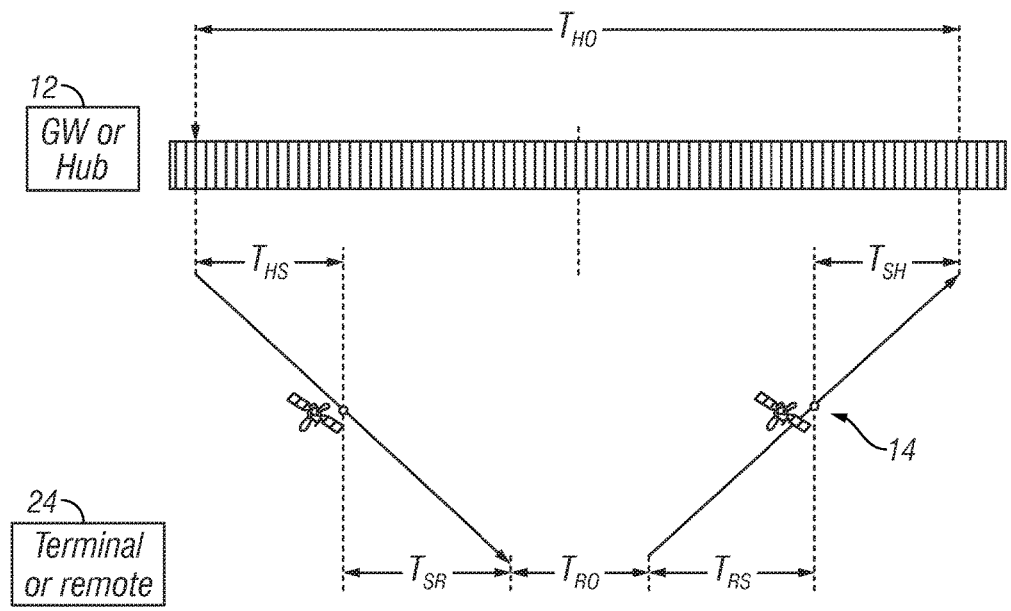
FIG. 11 illustrates an example of a process for deriving a timing adjustment from the satellite to the user terminal and from the satellite to the gateway according to a disclosed embodiment.

As shown in FIG. 11, the length of the timing aperture used to receive the initial startup bursts is dictated by the approximations used in estimating gateway-satellite round-trip delay $T_{HSH}$ value, which is the sum of $T_{HS}$ and $T_{SH}$ shown in FIG. 11, and satellite-terminal roundtrip delay $T_{SRS}$ value, which is the sum of $T_{SR}$ and $T_{RS}$ show in FIG. 11. For a geostationary satellite communication system, such as satellite communication network 10, $T_{HSH}$ and $T_{SRS}$ are of the order of 250 milliseconds. $T_{RO}$ is the timing adjustment that the user terminal 24 does to ensure the burst arrives inside the gateway receive window or aperture and can be calculated as follows with regard to FIG. 11.

Deriving $T_{RO}$ from the satellite 14 to the user terminal 24, and from the satellite 14 to the gateway 12 delay estimates, the value of $T_{RO}$ can be calculated as $$T_{RO} = T_{HO} - T_{HS} - T_{SH} - T_{SR} - T_{RS}$$

where $T_{HO}$ is a fixed number on the order of 650-700 milliseconds.

Figure 12:
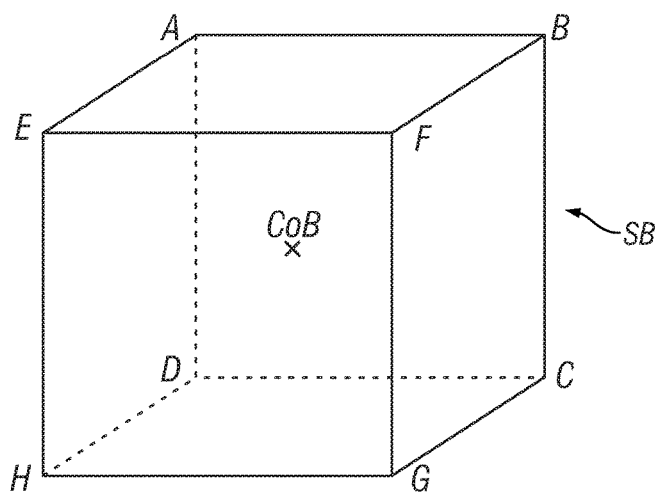
FIG. 12 is a conceptual diagram illustrating a satellite station keeping box and its coordinates.
Figure 13:
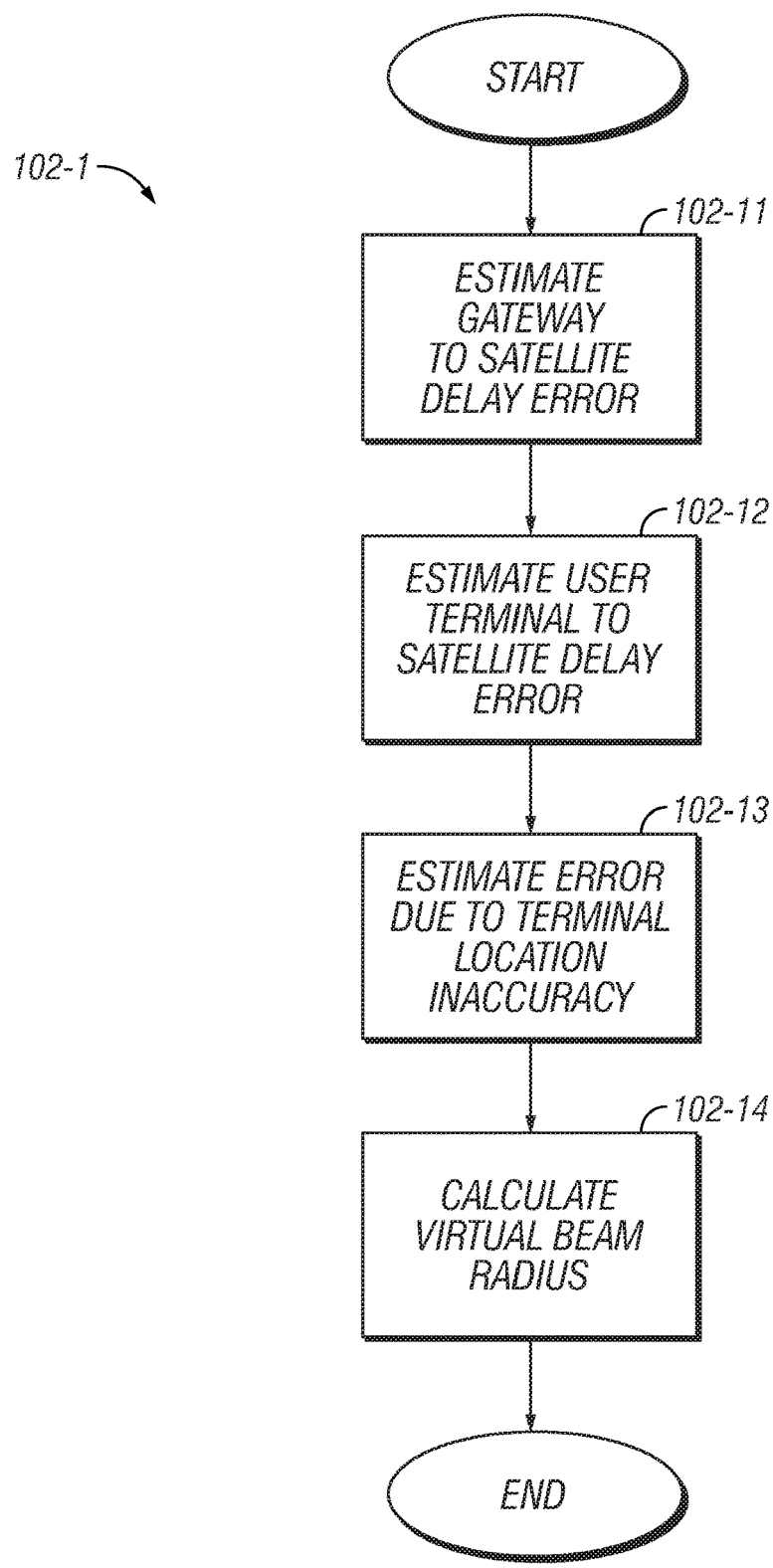
FIG. 13 is a flowchart illustrating an example of a process for establishing virtual beams for initial timing synchronization in a satellite communication network.

The errors in calculating $T_{RO}$ for the initial burst during startup are due to the uncertainties in the satellite location and the terminal location. The user terminal 24 on startup calculates (e.g., by the controller 36 or any other suitable controller) the $T_{HSH}$ based on exact gateway coordinates, but assumes that the satellite 14 is at a predetermined location in a cuboidal station keeping box SB as shown in FIG. 12. In particular, FIG. 12 shows this cuboidal station keeping box SB, the center of Box (CoB) and 8 vertices labeled A through H. Since the satellite 14 can be anywhere inside the station keeping box SB, this results in an error that can be as high as the delay difference between the center and the farthest vertex of the station keeping box SB. $T_{SRS}$ is also computed by, for example, the controller 36 or any other suitable controller, assuming the satellite location, so the value of $T_{SRS}$ also has a similar error.

The terminal location used in $T_{SRS}$ computation will be based on the virtual beam center. The user terminal 24 could be present anywhere in the virtual beam circle, and the error would be dependent on the size of the virtual beam. Both of these errors due to the terminal location inaccuracy and the satellite location inaccuracy will add up and result in the initial startup burst arriving away from the center of the aperture. The aperture size should account for this total error.

Error Due to Satellite Location Inaccuracy

As discussed above, the satellite 14 is not always at a fixed location, but is maintained around a center location using orbit maneuvers. The range of the motion of the satellite 14 is limited in the cuboidal station keeping box SB around the center CoB.

Gateway to Satellite Delay Estimate Error

Since the gateway to satellite delay (THS or TSH) initially is estimated assuming the satellite 14 is at CoB, there is an error in the estimate since the satellite 14 could be anywhere in the box. Thus, in this example, the error is calculated in step 102-11 of the flowchart of FIG. 13 if the satellite was actually present at any of the 8 vertices. This is done for each of the gateways 12.

$$T_{HSH} = 2\sqrt{\frac{(x_{sat} - x_{gw})^2 + (y_{sat} - y_{gw})^2 + (z_{sat} - z_{gw})^2}{speed\_light}}$$

Figure 14:
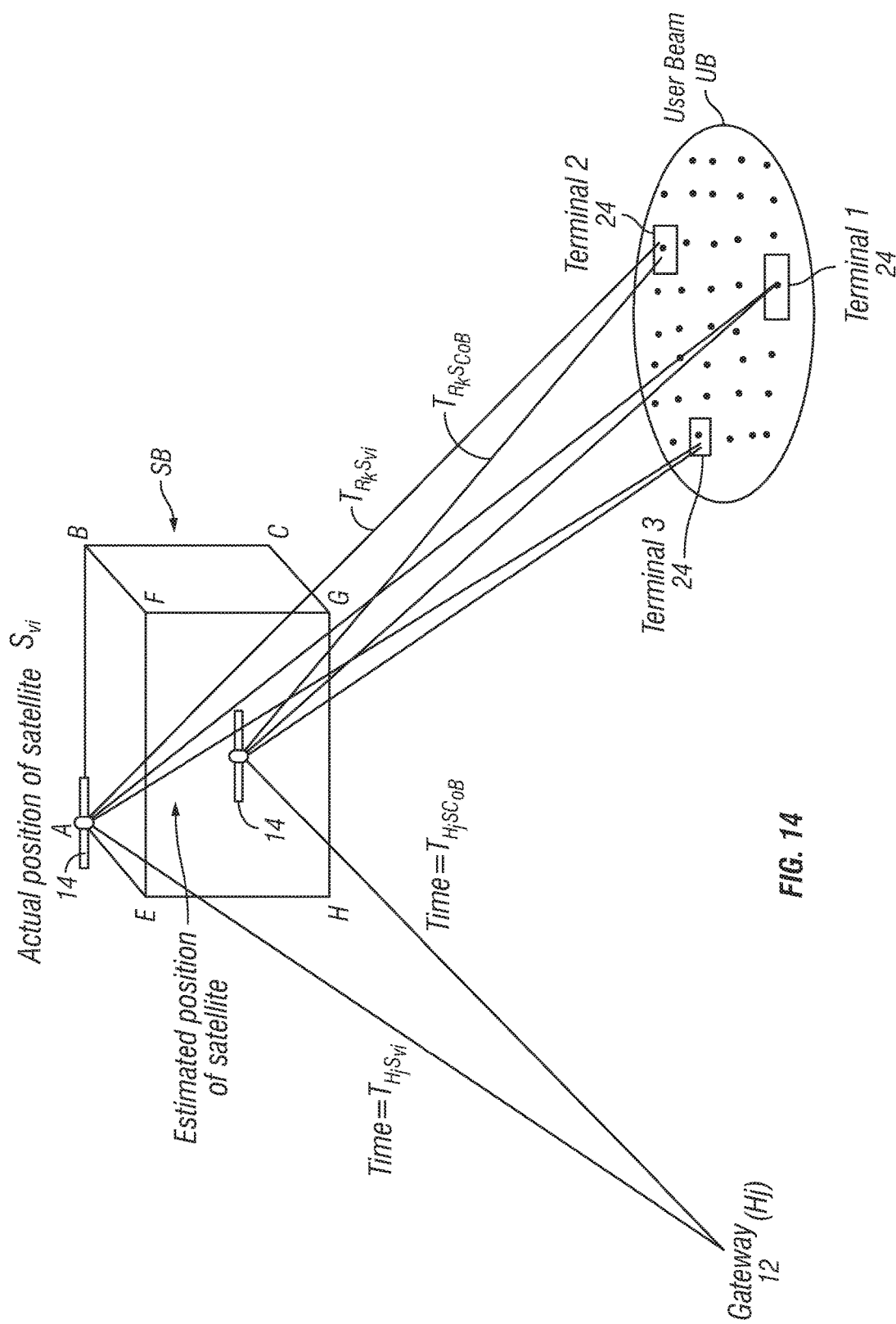
FIG. 14 is a conceptual diagram illustrating an example of estimated signal propagation time errors between a gateway and a satellite station keeping box and between user terminals and the satellite in the satellite station keeping box.

For instance, the error if the satellite 14 is at vertex A, as shown in FIG. 14, is given by $$\text{Error}(A) = T_{HSH}(A) - T_{HSH}(COB)$$

and similar respective calculations of the error can be made if the satellite 14 is at vertex B through H. As can be appreciated from FIG. 14, the estimated propagation time between the gateway 12 and the satellite 14 when the satellite 14 is at vertex A is the estimated propagation time represented by $T_{HjSvi}$. The estimated propagation time between the gateway 12 and the satellite 14 when the satellite 14 is at the center CoB is represented by $T_{HjSCoB}$.

Terminal to Satellite Delay Estimate Error

Figure 15:
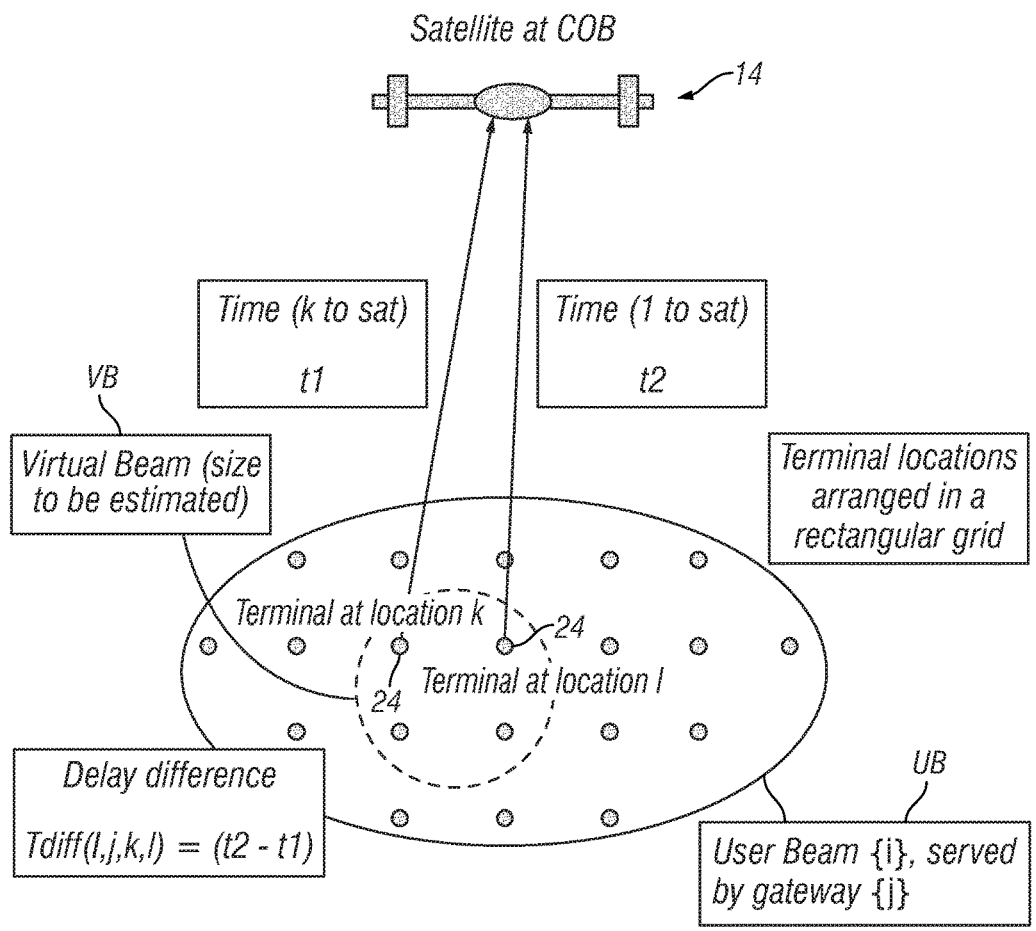
FIG. 15 is a conceptual diagram illustrating a grid of terminals across a user beam that are 0.03 degrees apart in azimuth and elevation and how to calculate the difference in delay between any of the terminals in the user beam and the satellite.

Similar to the $T_{HS}$ estimate, the terminal to satellite delay ($T_{RS}$ or $T_{SR}$) initial estimate is also made assuming the satellite 14 is at the CoB and hence also has an error due to the satellite location inaccuracy as discussed with regard to FIGS. 12, 14 and 15. To calculate this error in step 102-12, the process assumes that the user terminals 24 are distributed along a rectangular grid of coordinates (azimuth, elevation). This grid of points is spaced 0.03 degrees along (az,el) axes. The resolution of 0.03 degrees allows to get a fine resolution of points across the coverage area without overwhelming the computational resources. For purposes of this example, the assumed terminal locations in the user beam UB are identified as Terminal 1, Terminal 2 and Terminal 3 in FIG. 14, and by coordinates in FIG. 15 that are consistent with the equations set forth herein. For each of these assumed terminal locations, the delay to the satellite CoB and the delay to each of the 8 corner vertices A through H of the cuboidal station keeping box SB are calculated. The difference in delay between the CoB and each of the 8 corner vertices A though H are then calculated.

Adding the terminal to satellite delay error for each of the grid point locations to the corresponding gateway delay error for that beam gives us the total one way error from the center of box CoB that the system would experience if the satellite 14 was actually at a cuboidal vertex A through H. This calculation is repeated for each of the 8 vertices A though H. The worst case error permitted for each virtual beam VB is calculated as the maximum absolute value among the 8 vertex points and the maximum across the whole virtual beam VB. Terr_satloc(i,j) is the maximum one way error for user beam {i} and corresponding gateway {j} in the combined delay estimate ($T_{HS}+T_{SR}$) due to satellite location inaccuracy.

$$\text{Terr\_satloc}(i, j) = \max_k \left[ \max_{vi} \left( (T_{H_j S_{CoB}} - T_{H_j S_{vi}}) + (T_{R_k S_{CoB}} - T_{R_k S_{vi}}) \right) \right]$$

$T_{R_k S_{CoB}}$ – Time from terminal {k} to satellite at {CoB}

$T_{R_k S_{vi}}$ – Time from terminal {k} to satellite at any vertice of the cuboidal box {vi}

$T_{H_j S_{vi}}$ – Time from gateway {j} to satellite at any vertice of the cuboidal box {vi}

$T_{H_j S_{CoB}}$ – Time from gateway {j} to satellite at CoB

Error Due to Terminal Location Inaccuracy

In case the GPS location of the terminal is unknown, an approximate address can be used to determine the virtual beam VB in which the user terminal 24 is located as shown, for example, in FIG. 15. The virtual beam center could be used as the terminal location to estimate the initial delay between satellite 14 and user terminal 24. The estimation error due to the actual location of the terminal versus the virtual beam center that is used will be taken into account for calculating the receive aperture at the gateway 12 in the calculations of step 102-13.

The process defines the total maximum error in the one-way (terminal-satellite) due to the location inaccuracy of the terminal as Terr_termloc(i,j). In the computation of $T_{RO}$:

$T_{RO}=T_{HO}-T_{HS}-T_{SH}-T_{SR}-T_{RS}$

The error in the terminal to satellite delay estimate will appear 2 times on the right hand side (with $T_{RS}$ and $T_{SR}$) and contributes a total maximum error of 2* Terr_termloc(i,j).

The total maximum error in the estimate is the sum of the errors due to satellite location assumption, and terminal location inaccuracy. The maximum error in $T_{RO}$ is equal to the maximum receive aperture at the gateway (gat_aper). Using this information, the maximum allowable error due to terminal location accuracy can be calculated.

2*Terr_termloc(i,j)+2*Terr_satloc(i,j)=gat_aper/2

Terr_termloc(i,j)=(gat_aper/2−2*Terr_satloc(i,j))/2

Calculating the Virtual Beam Parameters

The maximum allowable error due to terminal location inaccuracy is calculated from the equation above for each user beam. If the radius of the virtual beam is defined as "r", then "r" should be such that a user terminal 24 located anywhere in the virtual beam VB will have a satellite to remote delay that is not greater than the sum of the delay as seen by the terminal at the virtual beam center and Terr_termloc. To ease the installation/management of the virtual beams VB, the virtual beam VB is chosen as a circle and all the virtual beams VBs in a particular user beam UB can have the same radius or substantially the same radius.

To be able to find the radius that will satisfy this requirement, a grid of terminals across the user beam UB is assumed as shown in FIG. 15. The delay to the satellite CoB for each of these terminals and the difference in delay between each of the grid points and its 4 neighboring points (0.03 deg away in az or el) is then calculated. The maximum delay difference across the whole beam for each user beam UB is used to calculate the radius of the virtual beam VB. This allows for the use of the same radius for each virtual beam VB across the whole user beam UB. As can be appreciated by one skilled in the art, the number and dimension of each of the virtual beams VBs, can be calculated based on the description herein by the control system, such as by the controller 46 shown in FIG. 1, or by any other suitable controller, in step 102-14. FIG. 15 shows the concept of calculating the delay to the satellite 14 from each of the terminal location grid points and then calculating the delay difference for each of the four neighbors (0.03 deg away in az or el) of that point.

The virtual beam radius (degrees) is then given by:

$$r_{VB}(i, j) = gp_{spacing} * \text{Terr\_termloc}(i, j) / \max_k \max_l Tdiff(i, j, k, l)$$

$r_{VB}(i, j)$ is the virtual beam radius for user beam $i$ corresponding to gateway $j$ $Tdiff(i, j, k, l)$ is the difference in satellite to terminal delay for point $k$ and $l$, assuming satellite at CoB $\text{Terr}_{termloc}(i, j)$ is the maximum error in satellite to terminal delay estimate tolerable due to terminal location inaccuracy $gp_{spacing}$ is the distance between two neighboring grid points, in this analysis 0.03 deg According to this equation, there is a maximum possible terminal position error that can be tolerated because of the gateway receive aperture size and the satellite position error as discussed herein. It is assumed that the terminal position is at one grid point, but its actual position is at its neighboring grid point, and the timing error is between these two grid points. This calculation is performed for all the grid points, and the maximum possible timing error is calculated between two neighboring points. Since the distance between any two neighboring grid points (e.g., 0.03 degrees in az,el) is known, the radius (in degrees) of the virtual beam VB can be calculated that can satisfy the maximum possible terminal position error condition.

Figure 16:
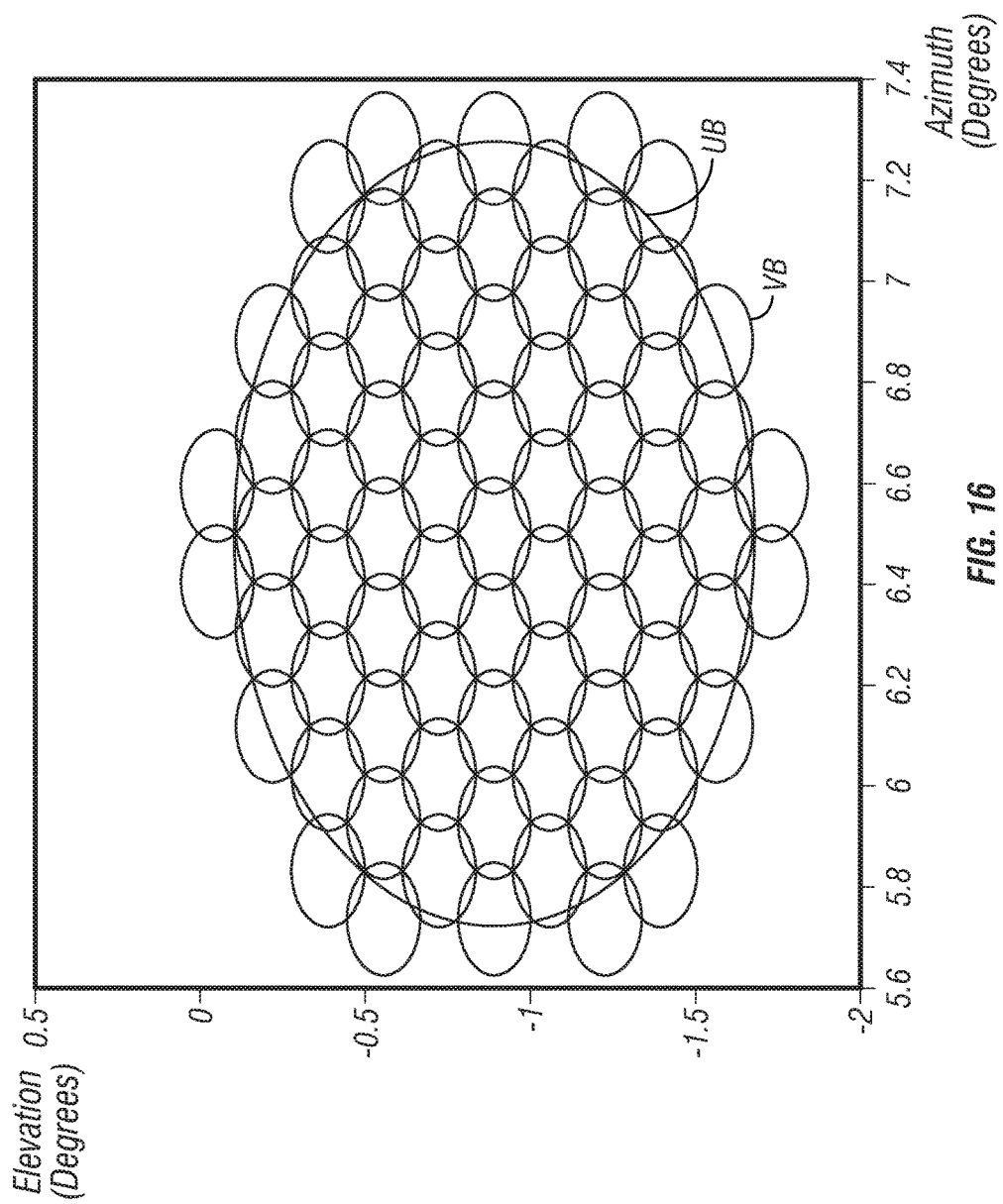
FIG. 16 illustrates an example of virtual beams in a user beam.

Using the virtual beam radius, a hexagonal honeycomb fit can be obtained such that the complete user beam UB is covered without leaving any gaps between any of the virtual beams VBs as shown, for example, in FIG. 16.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of unstated features, elements, components, groups, integers and/or steps. The foregoing also applies to words having similar meanings such as the terms, "including", "having"

and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method for establishing a virtual beam for timing synchronization in a satellite communication network, the method comprising:
    estimating, by an electronic controller, a maximum satellite position error associated with an estimated position of a satellite of the satellite communication network within a satellite location space;
    estimating, by the controller, a maximum remote unit position error associated with estimated position of a remote unit that is configured to communicate with the satellite of the satellite communication network, including estimating a gateway travel time error pertaining to an estimated travel time of a signal between the satellite and a gateway of the satellite communication network;
    establishing, by the controller, a size of the virtual beam based on the maximum satellite position error, the maximum remote unit position error, and the gateway travel time error; and
    creating, with the electronic controller, a virtual map for the virtual beam.

2. The method according to claim 1, wherein the estimating of the gateway travel time error comprises
    identifying a plurality of points along edges defining the satellite location space which is a three-dimensional space;
    estimating a respective gateway travel time error pertaining to a respective estimated travel time of the signal between the gateway and each of the plurality of points; and
    estimating the gateway travel time error based on the respective gateway travel time error for each of the plurality of points.

3. The method according to claim 2, wherein
    the estimating of the respective gateway travel time error for each of the plurality of points comprises estimating a reference travel time of the signal between the gateway and a center of the satellite location space, and determining a respective difference between the reference travel time and the respective estimated gateway travel time for each of the plurality of points.

4. The method according to claim 1, wherein
    the estimating of the maximum satellite position error includes estimating a remote unit travel time error pertaining to an estimated travel time of a signal between the satellite and the remote unit; and
    the establishing of the size of the virtual beam is based on the remote unit travel time error.

5. The method according to claim 4, wherein the estimating of the remote unit travel time error comprises
    identifying a plurality of points along edges defining the satellite location space which is a three-dimensional space;
    estimating a respective remote unit travel time error pertaining to a respective estimated travel time of the signal between the remote unit and each of the plurality of points; and
    estimating the remote unit travel time error based on the respective remote unit travel time error for each of the plurality of points.

6. The method according to claim 5, wherein
    the estimating of the respective remote unit travel time error for each of the plurality of points comprises estimating a reference travel time of the signal between the remote unit and a center of the satellite location space, and determining a respective difference between the reference travel time and the respective estimated travel time for each of the plurality of points.

7. The method according to claim 1, wherein
    the estimating of the maximum satellite position error includes estimating a gateway travel time error pertaining to an estimated travel time of a signal between the satellite and a gateway of the satellite communication network, and estimating a remote unit travel time error pertaining to an estimated travel time of a signal between the satellite and the remote unit; and
    the estimating of the remote unit position error is based on the estimated gateway travel time error, the estimated remote unit travel time error and a hardware receive aperture size of the gateway.

8. The method according to claim 1, wherein the establishing of the size of the virtual beam is based on the remote unit position error.

9. The method according to claim 1, wherein
    the establishing of the size of the virtual beam comprises establishing a respective size of each of a plurality of virtual beams within a user beam based on the maximum satellite position error, the maximum remote unit position error and a hardware receive aperture of the gateway.

10. The method according to claim 9, wherein
    the respective size of all of the plurality of virtual beams is the same.

11. The system according to claim 1, wherein
the control system is configured to establish establishing a respective size of each of a plurality of virtual beams within a user beam based on the maximum satellite position error, the maximum remote unit position error and a hardware receive aperture of the gateway.

12. A system for establishing a virtual beam for timing synchronization in a satellite communication network, the system comprising:
a control system, including an electronic controller configured to estimate a maximum satellite position error associated with an estimated position of a satellite of the satellite communication network within a satellite location space, estimate a maximum remote unit position error associated with estimated position of a remote unit that is configured to communicate with the satellite of the satellite communication network, estimate the maximum satellite position error by estimating a gateway travel time error pertaining to an estimated travel time of a signal between the satellite and a gateway of the satellite communication network, establish a size of the virtual beam based on the maximum satellite position error, the maximum remote unit position error, and the gateway travel time error, and create a virtual map for the virtual beam.

13. The system according to claim 12, wherein
the control system is configured to estimate the gateway travel time error by identifying a plurality of points along edges defining the satellite location space which is a three-dimensional space, estimating a respective gateway travel time error pertaining to a respective estimated travel time of the signal between the gateway and each of the plurality of points, and estimating the gateway travel time error based on the respective gateway travel time error for each of the plurality of points.

14. The system according to claim 13, wherein
the control system is configured to estimate the respective gateway travel time error for each of the plurality of points by estimating a reference travel time of the signal between the gateway and a center of the satellite location space, and determining a respective difference between the reference travel time and the respective estimated gateway travel time for each of the plurality of points.

15. The system according to claim 12, wherein
the control system is configured to estimate the maximum satellite position error by estimating a remote unit travel time error pertaining to an estimated travel time of a signal between the satellite and the remote unit, and establish the size of the virtual beam based on the remote unit travel time error.

16. The system according to claim 15, wherein
the control system is configured to estimate the remote unit travel time error by identifying a plurality of points along edges defining the satellite location space which is a three-dimensional space, estimating a respective remote unit travel time error pertaining to a respective estimated travel time of the signal between the remote unit and each of the plurality of points, and estimating the remote unit travel time error based on the respective remote unit travel time error for each of the plurality of points.

17. The system according to claim 16, wherein
the control system is configured to estimate the respective remote unit travel time error for each of the plurality of points by estimating a reference travel time of the signal between the remote unit and a center of the satellite location space, and determining a respective difference between the reference travel time and the respective estimated travel time for each of the plurality of points.

18. The system according to claim 12, wherein
the control system is configured to estimate the maximum satellite position error by estimating a gateway travel time error pertaining to an estimated travel time of a signal between the satellite and a gateway of the satellite communication network, and estimating a remote unit travel time error pertaining to an estimated travel time of a signal between the satellite and the remote unit; and
the control system is configured to estimate the remote unit position error based on the estimated gateway travel time error and the estimated remote unit travel time error.

* * * * *